United States Patent
Badishi et al.

(10) Patent No.: US 10,310,992 B1
(45) Date of Patent: *Jun. 4, 2019

(54) MITIGATION OF CYBER ATTACKS BY POINTER OBFUSCATION

(71) Applicant: PALO ALTO NETWORKS INC., Santa Clara, CA (US)

(72) Inventors: Gal Badishi, Tel Aviv (IL); Netanel Davidi, Zefat (IL)

(73) Assignee: PALO ALTO NETWORKS INC., Santa Clara, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/276,807

(22) Filed: Sep. 27, 2016

Related U.S. Application Data

(63) Continuation of application No. 13/969,650, filed on Aug. 19, 2013, now Pat. No. 9,471,514.

(60) Provisional application No. 61/692,344, filed on Aug. 23, 2012.

(51) Int. Cl.
| | | |
|---|---|---|
| *G06F 12/00* | (2006.01) | |
| *G06F 13/00* | (2006.01) | |
| *G06F 12/14* | (2006.01) | |
| *G06F 9/445* | (2018.01) | |

(52) U.S. Cl.
CPC ...... *G06F 12/1458* (2013.01); *G06F 9/44521* (2013.01); *G06F 2212/1052* (2013.01)

(58) Field of Classification Search
CPC ............. G06F 12/1458; G06F 9/44521; G06F 2212/1052

USPC ........................................................ 711/163
See application file for complete search history.

(56) References Cited

U.S. PATENT DOCUMENTS

| | | | | |
|---|---|---|---|---|
| 5,418,956 A | * | 5/1995 | Willman | G06F 12/1036 711/206 |
| 5,619,698 A | * | 4/1997 | Lillich | G06F 8/65 717/168 |
| 5,790,856 A | * | 8/1998 | Lillich | G06F 8/65 717/163 |
| 6,412,071 B1 | * | 6/2002 | Hollander | G06F 12/1441 726/23 |
| 6,539,474 B2 | * | 3/2003 | Matsuura | G06F 8/60 711/103 |
| 6,546,553 B1 | * | 4/2003 | Hunt | G06F 9/44521 717/174 |
| 6,629,123 B1 | * | 9/2003 | Hunt | G06F 9/5066 714/E11.209 |
| 6,651,117 B1 | * | 11/2003 | Wilson | H04L 12/413 370/351 |
| 6,760,840 B1 | * | 7/2004 | Shimbo | G06F 17/24 380/29 |
| 6,823,460 B1 | * | 11/2004 | Hollander | G06F 12/1441 726/3 |

(Continued)

*Primary Examiner* — Sheng Jen Tsai
(74) *Attorney, Agent, or Firm* — Kligler & Associates

(57) ABSTRACT

A method for protecting a computer includes identifying a first pointer in a data structure used by a computer program indicating a first memory address to be accessed, using the pointer, in order to invoke a functionality of the computer. The identified first pointer is replaced with a second pointer indicating a second memory address, different from the first memory address. A security program module traps attempts to access the second memory address during execution of the computer program so as to foil unauthorized access to the functionality of the computer.

26 Claims, 3 Drawing Sheets

(56) References Cited

U.S. PATENT DOCUMENTS

| | | | | |
|---|---|---|---|---|
| 6,907,546 | B1* | 6/2005 | Haswell | G06F 11/3684 714/38.11 |
| 7,100,195 | B1* | 8/2006 | Underwood | G06F 9/451 726/2 |
| 7,337,327 | B1* | 2/2008 | Sallam | G06F 21/554 713/189 |
| 7,657,695 | B1* | 2/2010 | Wheeler | G06F 9/455 711/159 |
| 7,814,554 | B1* | 10/2010 | Ragner | G06F 21/52 713/165 |
| 8,250,648 | B2* | 8/2012 | Kabzinski | G06F 21/78 711/100 |
| 8,677,118 | B1* | 3/2014 | Liu | G06F 21/56 709/219 |
| 9,471,514 | B1* | 10/2016 | Badishi | G06F 12/1458 |
| 2002/0144153 | A1* | 10/2002 | LeVine | G06F 21/10 726/33 |
| 2003/0177371 | A1* | 9/2003 | Rothrock | G06F 21/51 713/189 |
| 2004/0088719 | A1* | 5/2004 | Gazdik | G06F 9/44521 719/330 |
| 2004/0168070 | A1* | 8/2004 | Szor | G06F 21/564 713/188 |
| 2004/0193755 | A1* | 9/2004 | Safranek | G06F 12/1425 710/22 |
| 2004/0199763 | A1* | 10/2004 | Freund | G06F 21/53 713/154 |
| 2004/0255163 | A1* | 12/2004 | Swimmer | G06F 21/552 726/24 |
| 2005/0183094 | A1* | 8/2005 | Hunt | G06F 9/465 719/315 |
| 2005/0193137 | A1* | 9/2005 | Farnham | H04L 69/32 709/230 |
| 2005/0240906 | A1* | 10/2005 | Kinderknecht | G06F 9/44521 717/136 |
| 2006/0020689 | A1* | 1/2006 | Roman | G06F 8/00 709/220 |
| 2007/0113291 | A1* | 5/2007 | Dai | G06F 21/629 726/27 |
| 2009/0113110 | A1* | 4/2009 | Chen | G06F 9/45558 711/6 |
| 2009/0241131 | A1* | 9/2009 | Needamangala | G06F 11/3672 719/327 |
| 2010/0030975 | A1* | 2/2010 | Murray | G06F 8/52 711/154 |
| 2010/0128582 | A1* | 5/2010 | Bennett | G11B 20/10 369/47.14 |
| 2010/0128866 | A1* | 5/2010 | Irun-Briz | G06F 9/545 379/265.02 |
| 2011/0239306 | A1* | 9/2011 | Avni | G06F 21/54 726/26 |
| 2012/0254995 | A1* | 10/2012 | Sallam | G06F 21/554 726/22 |
| 2012/0255011 | A1* | 10/2012 | Sallam | G06F 21/554 726/24 |
| 2013/0086299 | A1* | 4/2013 | Epstein | G06F 12/1475 711/6 |
| 2013/0091538 | A1* | 4/2013 | Chirra | H04L 63/0263 726/1 |
| 2013/0132690 | A1* | 5/2013 | Epstein | G06F 12/1416 711/159 |
| 2013/0185545 | A1* | 7/2013 | Lin | G06F 9/30043 712/225 |
| 2013/0232540 | A1* | 9/2013 | Saidi | G06F 21/6218 726/1 |
| 2013/0276056 | A1* | 10/2013 | Epstein | G06F 21/604 726/1 |
| 2013/0312099 | A1* | 11/2013 | Edwards | G06F 21/554 726/24 |

* cited by examiner

MITIGATION OF CYBER ATTACKS BY POINTER OBFUSCATION

CROSS-REFERENCE TO RELATED APPLICATIONS

This application is a continuation of U.S. patent application Ser. No. 13/969,650, filed Aug. 19, 2013, which claims the benefit of U.S. Provisional Patent Application 61/692,344, filed Aug. 23, 2012, which is incorporated herein by reference.

FIELD OF THE INVENTION

The present invention relates generally to computer software, and particularly to techniques for mitigating vulnerability of computer systems to malicious software.

BACKGROUND

Many computer systems and software suffer from bugs, i.e., errors in programming, that result in security vulnerabilities. Attackers attempt to discover and exploit these vulnerabilities in order to elevate their privileges and perform unauthorized actions in the computer system. Such exploitation may include, for example, installing and running malicious programs, copying and/or deleting files, manipulating software functions, and possibly rendering the system completely non-operational. Vulnerabilities that may be exploited for such purposes include, but are not limited to, stack and heap buffer overflows, as well as other kinds of memory corruptions.

SUMMARY

Embodiments of the present invention provide methods, apparatus and software for manipulating the operation of memory pointers in a computer, in a manner that can be used to mitigate exploitation of software vulnerability.

There is therefore provided, in accordance with an embodiment of the present invention, a method for protecting a computer, which includes identifying a first pointer in a data structure used by a computer program indicating a first memory address to be accessed, using the pointer, in order to invoke a functionality of the computer. The identified first pointer is replaced with a second pointer indicating a second memory address, different from the first memory address. A security program module is used to trap attempts to access the second memory address during execution of the computer program so as to foil unauthorized access to the functionality of the computer.

In some embodiments, trapping the attempts includes analyzing, using the security program module, a source of an attempt to access the second memory address, and upon finding the source to be unauthorized, blocking access to the functionality. Typically, an alert is issued from the security program model with respect to the attempt. Additionally or alternatively, upon finding the source to be an authorized operation of the computer, the second memory address is corrected to the first memory address, and the authorized operation is permitted to resume using the first memory address.

In a disclosed embodiment, trapping the attempts includes invoking an exception handler module in response to attempts to access the second memory address. Typically, replacing the identified first pointer includes assigning the second memory address to be in a location to which access is not permitted by the computer, such that the attempts to access the second memory address cause exceptions, which invoke the exception handler module.

In one embodiment, the first pointer indicates a location of a function table of the computer program.

The security program module may include a dynamic-link library (DLL), which is configured to be loaded prior to the execution of the computer program so as to identify and replace the first pointer prior to the execution and to trap the attempts to access the second memory address during the execution.

There is also provided, in accordance with an embodiment of the present invention, computing apparatus, including a memory, which is configured to store a computer program and data structures associated with the computer program. A processor, is coupled to the memory and is configured to run a security program module, which causes the processor to identify a first pointer in a data structure used by the computer program indicating a first memory address to be accessed, using the first pointer, in order to invoke a functionality of the computing apparatus, and to replace the identified first pointer with a second pointer indicating a second memory address, different from the first memory address, and to trap attempts to access the second memory address during execution of the computer program so as to foil unauthorized access to the functionality.

There is additionally provided, in accordance with an embodiment of the present invention, a computer software product, including a non-transitory computer-readable medium in which program instructions are stored, which instructions, when read by a computer, cause the computer to identify a first pointer in a data structure used by a computer program indicating a first memory address to be accessed, using the pointer, in order to invoke a functionality of the computer, to replace the identified first pointer with a second pointer indicating a second memory address, different from the first memory address, and to trap attempts to access the second memory address during execution of the computer program so as to foil unauthorized access to the functionality of the computer.

The present invention will be more fully understood from the following detailed description of the embodiments thereof, taken together with the drawings in which:

DETAILED DESCRIPTION OF EMBODIMENTS

Figure 1:
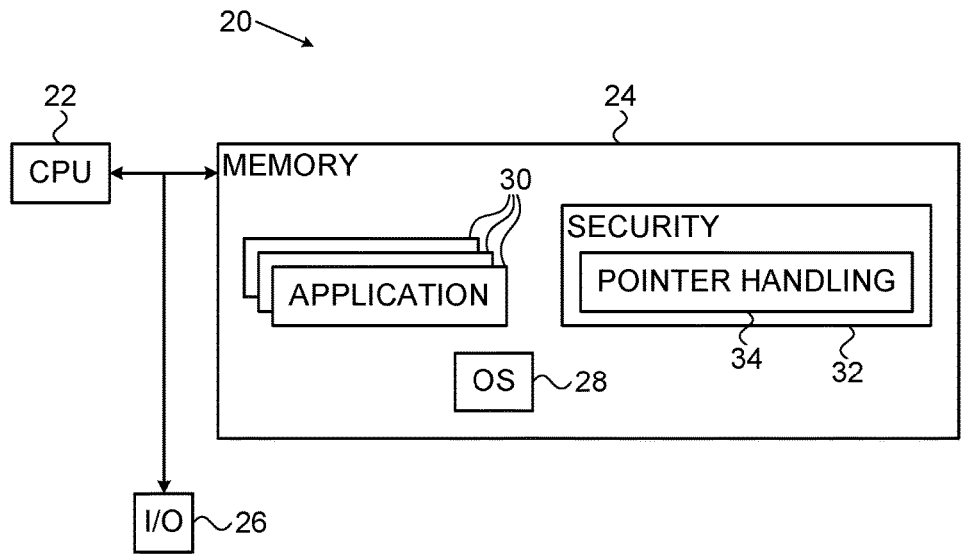
FIG. 1 is a block diagram that schematically illustrates elements of a computer, in accordance with an embodiment of the present invention.

Attackers frequently exploit software vulnerabilities to inject program code into the memory space of the vulnerable process and cause the computer to execute the injected code. This injected code, however, is not an integral part of the process, and therefore must find a way to communicate with the operating system of the computer in order to use its services. In many cases, the injected code attempts to find and exploit pointers that are used by the process to indicate memory locations where particular items of code or data reside.

For example, the injected program may attempt to establish communication with the operating system by searching for exported or imported functions in libraries that the operating system provides. The memory addresses of such functions are commonly listed in a function table that is provided in each library. (In Windows® operating systems, such function tables typically include an export address table (EAT) and/or an import address table (IAT) inside each library module.) Once the injected program has succeeded in finding the function table, it can use the addresses that it contains to exploit the corresponding operating system functions.

Embodiments of the present invention that are described hereinbelow foil such attempts by obfuscating pointers that might otherwise be used by unauthorized entities to access functionalities of a computer system. The term "functionality" is used, in the context of the present description and in the claims, to refer generally to operations that can be carried out by the computer under software control. In the example embodiments that follow, the functionality in question is implemented by operating system functions. In the scenario described above, for instance, the pointer that indicates the location of a function table may be modified so that it points to a different address and thus cannot be exploited by the injected code. The principles of the disclosed embodiments, however, may be applied to obfuscate pointers that indicate locations of software routines, data structures and files of other types, and the functionality that is accessed using such pointers may include, without limitation, performing any such routines, as well as reading out or modifying such data.

In the disclosed embodiments, a security program module, running on a computer, identifies a pointer in a data structure used by a computer program. The pointer indicates a memory address to be accessed in order to invoke a function (and possibly multiple functions) of the computer. The security program module replaces this pointer with a substitute pointer, indicating a substitute memory address. This pointer replacement typically takes place at an early stage of executing the program, before the program actually begins to run. Subsequently, during execution, the security program module traps attempts to access the substitute memory address and thus is able to foil unauthorized access to the function or functions in question.

Upon trapping such a pointer access attempt, the security program module may analyze the source of the attempt in order to determine whether the attempt came from an authorized source, such as legitimate code executed by a program loaded by the operating system, or an unauthorized source, such as injected code unknown to the operating system. Upon finding the source to be an authorized operation of the computer, the security program module typically corrects the substitute memory address to the original, correct memory address that is needed in order to access the function, and permits the authorized operation to resume using the correct address. On the other hand, when the security program module finds the source of the access attempt to be unauthorized, it does not provide the new pointer, and thus blocks access to the desired function. Typically, upon detecting an unauthorized access attempt, the security program module issues an alert to indicate that such an attempt has been made.

In some embodiments, an exception handling function of the operating system of the computer is invoked in response to attempts to access the substitute memory address indicated by the substitute pointer. The operating system is instructed to pass such exceptions to the security program module. In this manner, the security program module is able to detect and respond to all such access attempts, whether authorized or not. In order to cause such exceptions to occur, the security program module may assign the substitute memory address to be in a location to which access is not permitted by the operating system of the computer. For this purpose, the security program module may, for example, ask the operating system to allocate a certain memory range and grant no access permissions for the range. When the substitute memory address is assigned to be in this range, any attempt to access the address will raise an exception.

As noted earlier, the techniques described herein are particularly effective in obfuscating pointers that indicate the location of a function table in a module of a computer program. In certain example embodiments that are described further hereinbelow, the function table in question may comprise an EAT or IAT, as defined above. Alternatively or additionally, these techniques may be applied, mutatis mutandis, in protecting sensitive pointers of other types, both in Windows and in other operating systems, such a pointers relating to the Global Offset Table (GOT) and Procedure Linkage Table (PLT) in Executable and Linkable Format (ELF) files that are used in Linux®, Unix® and other operating systems.

The security program module may usefully be provided as a library, such as a dynamic-link library (DLL) in Windows systems. This library is loaded prior to the execution of each computer program that is to be protected so as to identify and replace appropriate pointers prior to the execution and to trap the attempts to access the substitute memory address during the execution. Alternatively, other program configurations may be used, both in Windows and in other sorts of operating systems, and are considered to be within the scope of the present invention.

FIG. 1 is a block diagram that schematically illustrates elements of a computer 20 (also referred to as "computing apparatus"), in accordance with an embodiment of the present invention. A central processing unit (CPU) 22 reads and writes program components and data from and to a memory 24. Memory 24 typically comprises random-access memory (RAM), as well as non-volatile storage memory. Computer 20 may also comprise input/output (I/O) devices 26, such as a network interface controller and user interface elements, as well as other peripheral components (not shown).

CPU 22 typically comprises a general-purpose, programmable processor, which runs various programs using program instructions and data structures that are held in memory 24. These programs include an operating system 28 and application processes 30. In conjunction with these processes, CPU 22 runs security program modules provided in a security library 32, in order to detect and inhibit unauthorized access to resources of computer 20 by malicious code that may be injected into memory 24 by an attacker. The modules in security library 32 contain software, in the form of computer-readable program instructions, which may be downloaded to computer 20 in electronic form, over a network, for example. Additionally or alternatively, the software may be provided and/or stored on tangible, non-transitory computer-readable media, such as optical, magnetic, or electronic memory media.

In an embodiment of the present invention, library 32 includes a pointer handling module 34, which when run by the computer, causes the CPU to apply pointer obfuscation to prevent unauthorized access to functions of operating system 28. The operation of module 34 is described in greater detail hereinbelow. Typically, module 34 operates in conjunction with other sorts of security program modules, as are known in the art, but these additional security functions are beyond the scope of the present description.

Figure 2:
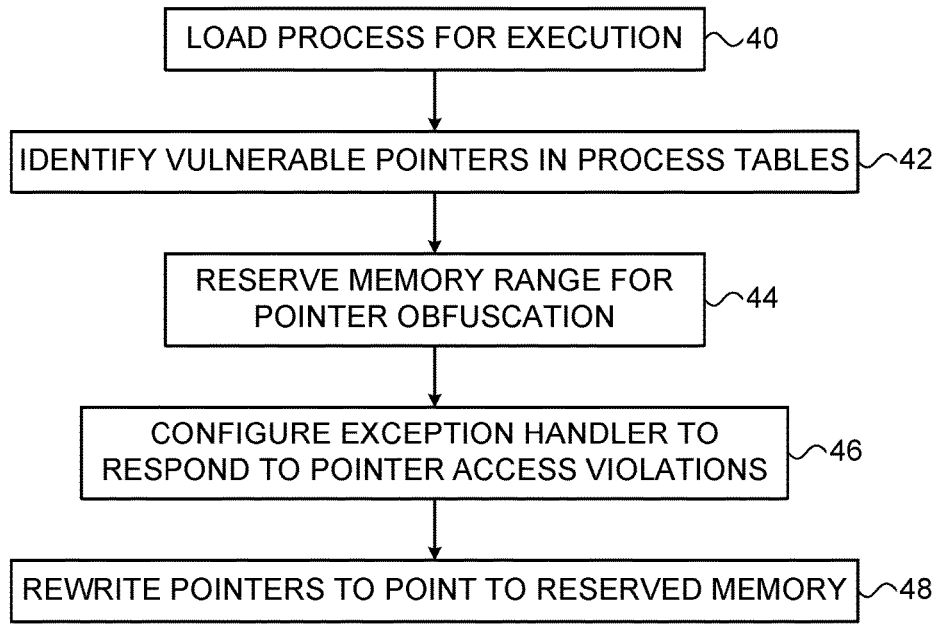
FIG. 2 is a flow chart that schematically illustrates a method for controlling pointer operation, in accordance with an embodiment of the present invention.

FIG. 2 is a flow chart that schematically illustrates a method for controlling pointer operation in computer 20, in accordance with an embodiment of the present invention. The method is carried out by or under the control of pointer handling module 34. It is initiated whenever a new process 30 (or at least a new process that is classified as being potentially vulnerable) is loaded by operating system 28 into memory for execution by CPU 22, at a loading step 40. In Windows operating systems, for example, the process loader creates a process environment block (PEB), which then points to a sequence of DLLs.

Module 34 is typically configured as such a DLL and is loaded at an early stage in the DLL sequence, for example immediately after the well-known NTDLL, which exports the Windows native application program interface (API). In this manner, module 34 is injected into process 30 and is regarded by operating system 28 as a part of the process. Thus, for example, when module 34 requests a memory allocation, the operating system relates to the request as a request of process 30. Module 34 runs before the code of the process actually begins to run, performs the pointer handling steps described below, and then hands over execution to the actual process code.

Figure 3:
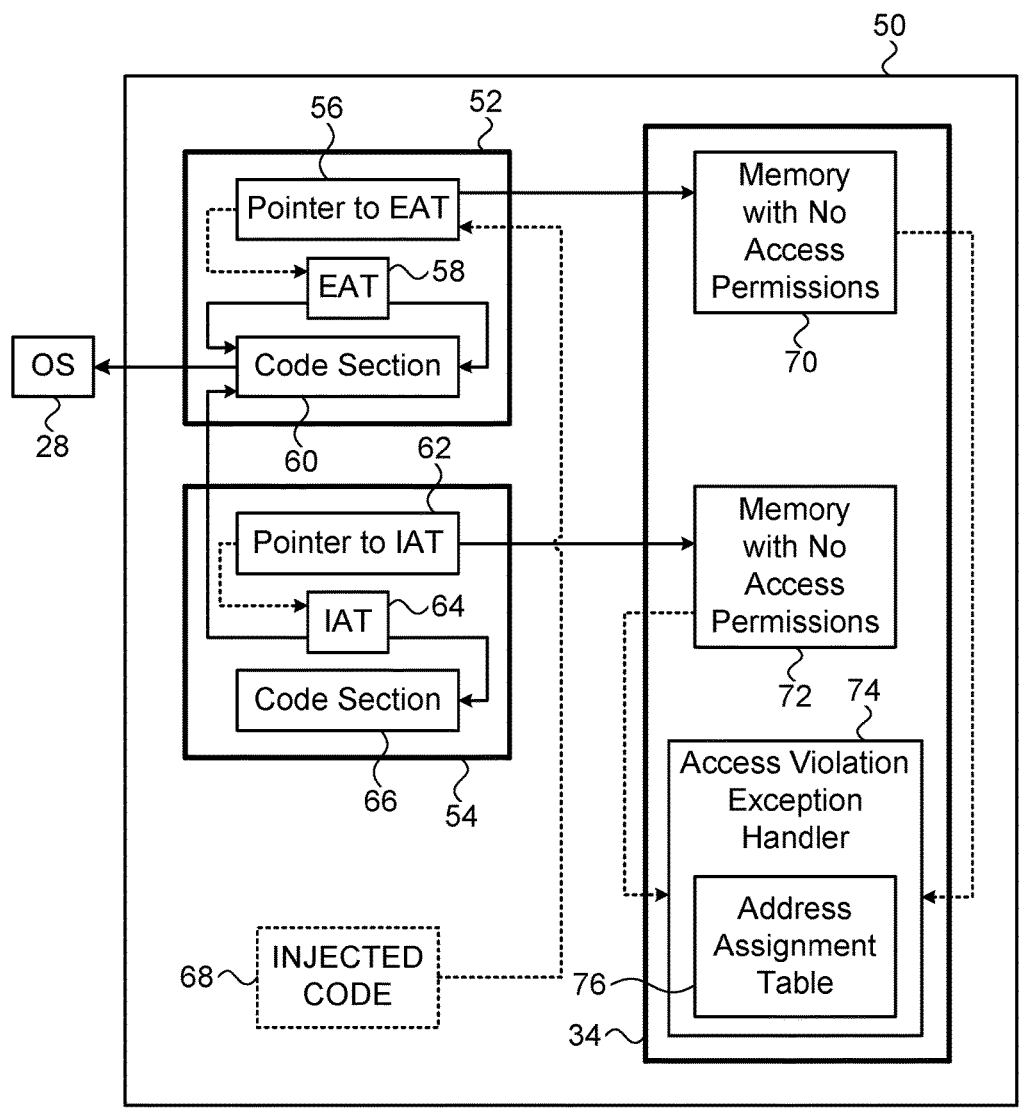
FIG. 3 is a block diagram that schematically illustrates program components in a memory space of a computer, in accordance with an embodiment of the present invention.

Pointer handling module 34 performs a number of functions while process 30 is being loaded. Module 34 identifies vulnerable pointers in data structures, such as tables, that are created in the course of loading process 30, at a vulnerable pointer identification step 42. In the present context, pointers are considered to be vulnerable if they can be used (particularly by unauthorized, injected code) to access functions of operating system 28. Pointers of this sort may include, but are not limited to, pointers that indicate the locations in memory 24 of the EAT and/or IAT of DLLs that are loaded for use by process 30. Module 34 is able to find these pointers at certain predefined locations within each DLL. Details of these data structures are shown in FIG. 3. Additionally or alternatively, module may identify other sorts of vulnerable pointers at step 42, in both Windows and other operating systems.

After identifying such vulnerable pointers, module 34 submits a request to operating system 28 to reserve a certain range of memory for use in pointer redirection, at a memory reservation step 44. Typically, the reserved range is a virtual memory range, and module 34 does not request that any of the range actually be committed in order to avoid wasting physical memory. Module 34 instructs the operating system to set the access permissions of the reserved range to "no access", so that user-level programs will not be allowed to access this reserved range. Any attempts to access the reserved range during execution of the process will cause the operating system to raise an exception.

When such an exception occurs during run time, operating system 28 will generally call an exception handling component that has been specified for this purpose in process 30. Module 34 configures the exception handling component so that memory access violations caused by the pointers rewritten at step 46 will be referred to module 34 for handling, at a handler configuration step 46. In Windows operating systems, for example, NTDLL contains a list of program components to call in sequence in case of an exception, and module 34 inserts the address of its own exception handling routine at the head of this list. In this manner, module 34 can ensure that it will be notified of and able to take the appropriate action whenever such an exception occurs. The resulting operation of module 34 during run time is described below specifically with reference to FIG. 4.

After completing these preparations, module 34 rewrites the memory addresses to which the pointers identified at step 42 point, at a pointer rewriting step 48. The new memory addresses are typically located in the memory range that was reserved at step 44. As a result, any attempt to invoke these pointers and access the (non-existent) data to which they point will lead to a memory access violation and invoke the exception handler.

Alternatively or additionally, module 34 may apply other sorts of hooks to the exception handling functions of operating system 28 and may, further alternatively or additionally, carry out the other steps of the method described above using other means that are appropriate either to Windows or to other operating environments that are known in the art. For example, in Unix and Linux-based operating systems, module 34 may use the mmap system call to create a private region of memory (combining the flags MAP_PRIVATE and MAP_ANONYMOUS), which is defined as inaccessible (PROT_NONE). Accessing this memory region will result in a segmentation fault, which can be handled by a signal handler in module 34. To ensure that the signal handler is first in line, as explained above, hooks can be installed in routines related to signal handling in user-mode or in kernel-mode.

FIG. 3 is a block diagram that schematically illustrates program components in an address space 50 of a given process 30 in memory 24, in accordance with an embodiment of the present invention. Program modules 52, 54, which may be DLLs, for example, contain various pointers. In the specific example shown in FIG. 3, module 52 exports certain functions to other modules and therefore contains a pointer 56 that is supposed to indicate the address of an EAT 58; while module 54 imports functions from other modules and therefore contains a pointer 62 that is supposed to indicate the address of an IAT 64. EAT 58 and IAT 64 contain pointers to particular functions that are contained in code sections 60, 66 of modules 52 and 54 (and possibly of other modules, as well, not shown in the figure). Some of these functions may interface with operating system 28.

Pointer handling module 34 reserves one or more ranges 70, 72 in memory 24, and instructs operating system 28 to set the permissions of these ranges to "no access." Module 34 replaces the original pointers 56 and to EAT 58 and IAT 64 with pointers to addresses in range 70 or 72. Attempts by program components to access the EAT or IAT using the corresponding pointers will therefore result in a memory access violation. As explained above, operating system 28 refers such violations to an exception handling routine 74 belonging to module 34.

Exception handling routine 74 maintains an address assignment table 76, indicating a range mapping between the substitute pointer addresses written at step 48 and the correct, original address of each of pointers 56, 62, etc. Routine 74 checks the source of each violation to determine whether it originated from legitimate program code run by process 30, or whether it originated from a suspect location, such as an area of memory 24 that may contain malicious code 68 injected by an attacker. In the former case, routine 74 will correct the address reference using table 76 and will instruct the process to continue. Otherwise, routine 74 will issue an alert, as explained further hereinbelow.

Figure 4:
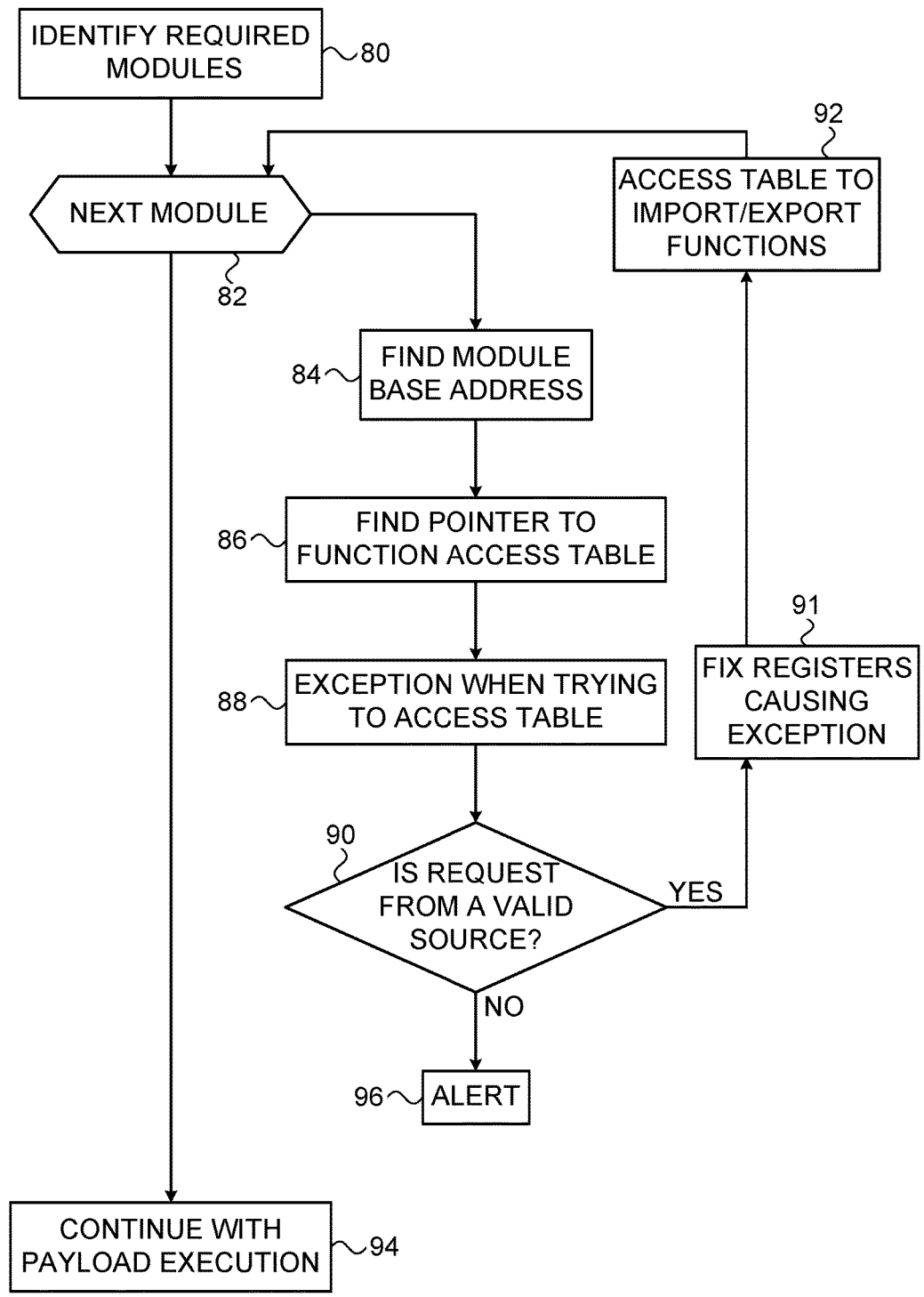
FIG. 4 is a flow chart that schematically illustrates a method for handling pointers in a computer program, in accordance with an embodiment of the present invention.

FIG. 4 is a flow chart that schematically illustrates a method for handling pointers in the course of execution of a computer program, such as one of processes 30, in accordance with an embodiment of the present invention. This method is carried out regardless of whether the program is running legitimately, without any sort of malicious payload, or whether its functionality has been "hijacked" by injection of malicious software, such as code 68. As process 30 runs, it identifies modules required for its operation, such as modules 52, 54, . . . , at a module identification step 80. The process iterates over these modules in order to access functions that they are to provide, at a module iteration step 82.

For each module, process 30 finds the base address of the module in address space 50, at a base identification step 84. Pointers to the function access table of the module (such as pointers 56 and 62 to EAT 58 and IAT 64, respectively) are generally based on pointers that appear at known offsets from the base address. Process 30 thus finds a pointer to a function access table in the current module, at a pointer finding step 86. The pointer in question, however, will have already been replaced by pointer handling module 34 with a different pointer, which indicates an address in a reserved address range, such as range 70 or 72.

Therefore, when process 30 attempts to access the address indicated by the pointer found at step 86, operating system 28 will raise an exception, at an exception step 88.

The exception is referred, as explained above, to exception handling routine 74 of security module 34, which analyzes the source of the attempted memory access, at a source validation step 90. In its exception notification to routine 74, operating system 28 generally provides a record of the exception that includes (inter alia) the memory location from which the pointer request at step 86 originated. Routine 74 can then use various criteria at step 90 in order to judge whether this location corresponds to valid, legitimate code, or to an injected, potentially malicious payload. For example, headers of program modules typically identify code sections within their respective memory space, and routine 74 may find the source of the pointer request to be valid if it came from such a code section.

Additionally or alternatively, routine 74 may build and maintain a whitelist of legitimate modules and functions, as well as a whitelist of memory ranges that have been allocated by trusted code and have appropriate permissions. Upon finding the source of the pointer request to be within the whitelist, routine 74 will validate the request.

Conversely, routine 74 may find at step 90 that the source of a pointer request is suspicious if it originated from an address that is not classified as code, such as an address that is supposed to contain data (and into which malicious code 68 may have been injected). In some cases, however, a clever attacker may program malicious code to jump to a read operation in a legitimate code section in order to access a pointer and may then jump back with the pointer value to the malicious code itself. To identify and inhibit this sort of behavior, routine 74 may examine the program flow in the vicinity of the pointer request in question in order to determine whether it conforms to normal flow patterns, or whether it contains anomalous patterns, such as jumps to and from a "bare" read operation. The latter sort of anomalous pattern may be indicative that injected code is at work.

Other criteria for determining whether a given program operation is of legitimate or malicious origin, as are known in the art, may similarly be applied at step 90 in validating the source of any given pointer request. Application of such alternative criteria, as will be apparent to those skilled in the art, is also considered to be within the scope of the present invention.

Upon deciding at step 90 that the source of the current attempt to access the address indicated by a function table pointer in a given module is legitimate, routine 74 provides the actual, original address of the desired function table to the program module that requested it, at an exception fixing step 91. Specifically, when a certain opcode in process 30 causes an exception by attempting to access an address in a reserved memory range, routine 74 may check which register or registers among the operands of the opcode contain the address. Routine may then correct the register value or values to contain the original address and prompts the process to restart the opcode. Process 30 is thus able to reach the desired function table (such as EAT 58 or IAT 64), and uses the pointer values in the function table to import or export the functions that it needs, at a table access step 92. The method continues to step 82 in order to process the next module, and then, once all necessary functions have been accessed, continues with execution of the program, at an execution step 94.

Otherwise, if validation of any of the pointer requests fails at step 90, security module 34 takes preventive action, at an alert step 96. Such actions may take the form, for example, of notifying the user of computer 20, logging the incident, sending a message to one or more external entities (such as a security control center or a reporting cloud service), terminating the process, and/or creating a memory dump file for subsequent analysis.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer when loading a computer program into a memory for execution by the computer, comprising:

before execution of the computer program by the computer, identifying a pointer, which points to a first memory address for accessing an operating system function in a data structure created for the computer program, and rewriting the identified pointer in the data structure for the computer program so that the identified pointer points to a second memory address, different from the first memory address, wherein the second memory address is defined with a permission setting which does not allow access, such that any attempt to access the second memory address will raise an exception; and configuring the computer to transfer control to program code that determines whether an access to the second memory address during execution of the computer program is a possible unauthorized access to the functionality of the computer, when the second memory address is accessed during execution of the computer program, wherein determining whether the access to the second memory address is a possible unauthorized access comprises analyzing a source of an attempt to access the second memory address, and upon finding the source to be an authorized operation of the computer, correcting the pointer in the data structure created for the computer program to point to the first memory address, and permitting the authorized operation to resume using the first memory address.

2. The method according to claim 1, and comprising upon finding the source to be unauthorized, blocking access to the functionality.

3. The method according to claim 2, and comprising issuing an alert with respect to the attempt.

4. The method according to claim 1, wherein the second memory address is in a location to which access is not permitted by an operating system of the computer, such that attempts to access the second memory address cause exceptions, which result in the transfer of control during execution of the computer program.

5. The method according to claim 1, wherein the first memory address is a location of a function table of the computer program.

6. The method according to claim 1, wherein the program code that determines comprises a dynamic-link library (DLL), which is configured to be loaded prior to the execution of the computer program.

7. Computing apparatus, comprising:
a memory, which is configured to store a computer program and data structures associated with the computer program; and
a processor, which is coupled to the memory and is configured:
before execution of the computer program by the computing apparatus, to identify a pointer, which points to a first memory address for accessing an operating system function in a data structure created for the computer program, and to rewrite the identified pointer in the data structure for the computer program so that the identified pointer points to a second memory address, different from the first memory address, wherein the second memory address is defined with a permission setting which does not allow access, such that any attempt to access the second memory address will raise an exception, and
to configure the computing apparatus to transfer control to program code that determines whether an access to the second memory address during execution of the computer program is a possible unauthorized access to the functionality of the computing apparatus, when the second memory address is accessed during execution of the computer program,
wherein determining whether the access to the second memory address is a possible unauthorized access comprises analyzing a source of an attempt to access the second memory address, and upon finding the source to be an authorized operation of the computer, correcting the pointer in the data structure created for the computer program to point to the first memory address, and permitting the authorized operation to resume using the first memory address.

8. The apparatus according to claim 7, wherein the program code that determines whether an access to the second memory address is a possible unauthorized access causes the processor upon finding the source to be unauthorized, to block access to the functionality.

9. The apparatus according to claim 8, wherein the program code that determines whether an access to the second memory address is a possible unauthorized access causes the processor to issue an alert with respect to the attempt.

10. The apparatus according to claim 7, wherein the processor is configured to assign the second memory address to be in a location to which access is not permitted by the computing apparatus, such that the attempts to access the second memory address cause exceptions, which result in the transfer of control during execution of the computer program.

11. The apparatus according to claim 7, wherein the first memory address is a location of a function table of the computer program.

12. The apparatus according to claim 7, wherein the program code that determines whether an access to the second memory address is a possible unauthorized access comprises a dynamic-link library (DLL), and wherein the processor configured to load the DLL into the memory when the computer program is loaded into the memory, prior to the execution of the computer program.

13. A computer software product, comprising a non-transitory computer-readable medium in which program instructions are stored, which instructions, include:
a pointer handling module which when read by a computer, causes the computer to identify before execution of the computer program by the computer, a pointer, which points to a first memory address for accessing an operating system function in a data structure created for the computer program, and to rewrite the identified pointer in the data structure for the computer program so that the identified pointer points to a second memory address, different from the first memory address, wherein the second memory address is defined with a permission setting which does not allow access, such that any attempt to access the second memory address will raise an exception; and
a security program module invoked when attempts to access the second memory address during execution of the computer program occur, which when invoked determines whether an access to the second memory address which invoked the security program module is a possible unauthorized access to a functionality of the computer program, when the second memory address is accessed during execution of the computer program,
wherein determining whether the access to the second memory address is a possible unauthorized access comprises analyzing a source of an attempt to access the second memory address, and upon finding the source to be an authorized operation of the computer, correcting the pointer in the data structure created for the computer program to point to the first memory address, and permitting the authorized operation to resume using the first memory address.

14. The product according to claim 13, wherein the instructions cause the computer upon finding the source to be unauthorized, to block access to the functionality.

15. The product according to claim 14, wherein the instructions cause the computer to issue an alert with respect to the attempt.

16. The product according to claim 13, wherein the instructions cause the computer to assign the second memory address to be in a location to which access is not permitted by the computer, such that the attempts to access the second memory address cause exceptions, which invoke an exception handler module that calls the security program module.

17. The product according to claim 14, wherein the first memory address is a location of a function table of the computer program.

18. The product according to claim 14, wherein the security program module comprises a dynamic-link library (DLL), which is configured to be loaded prior to the execution of the computer program.

19. The product according to claim 13, wherein the pointer handling module is included in a program module loaded to the memory with the computer program.

20. The product according to claim 19, wherein a classification of the computer program loaded into the memory is determined and the pointer handling module is included with the loaded computer program if the process is classified as potentially vulnerable.

21. The product according to claim 19, wherein the pointer handling module is included in a dynamic-link library (DLL) loaded to the memory with the process.

22. The product according to claim 13, wherein the pointer handling module additionally requests allocation of a memory range to include the second memory address.

23. The product according to claim 22, wherein the allocation request of the pointer handling module for the memory range to include the second memory address is provided to an operating system of the computer as a request of the computer program.

24. The product according to claim 23, wherein the pointer handling module does not request that the memory range be committed.

25. The method according to claim 1, wherein identifying the pointer is performed by a module injected into a process designated to run the computer program.

26. The method according to claim 25, wherein the injected module submits a request to the operating system to reserve a certain range of memory including the second memory address, with permission settings not allowing access to the range.

* * * * *